US005421076A

United States Patent [19]

Adrian et al.

[11] Patent Number: 5,421,076

[45] Date of Patent: Jun. 6, 1995

[54] METHOD FOR ASSEMBLING A BALUSTRADE FOR A PEOPLE MOVING DEVICE USING AN ADJUSTABLE ASSEMBLY JIG

[75] Inventors: Willy Adrian, Obernkirchen; Joachim Arens, Suthfeld; Gerald Wente, Pohle, all of Germany

[73] Assignee: Otis Elevator Company, Farmington, Conn.

[21] Appl. No.: 173,391

[22] Filed: Dec. 23, 1993

[51] Int. Cl.[6] ............................................ B23Q 3/00

[52] U.S. Cl. ..................................... 29/467; 29/468; 29/559

[58] Field of Search ................ 29/464, 466, 467, 468, 29/469, 559

[56] References Cited

U.S. PATENT DOCUMENTS 4,889,222 12/1989 Kanamori ............................ 29/446

*Primary Examiner*—Mark Rosenbaum

*Assistant Examiner*—David P. Bryant

[57] ABSTRACT

A method for assembling a balustrade for a people moving device is provided comprising the steps of providing a frame, balustrade components, and an adjustable assembly jig, aligning the balustrade components on the assembly jig in a predetermined geometry, assembling the balustrade components into a balustrade assembly on the assembly jig, and attaching the balustrade assembly to the frame.

9 Claims, 7 Drawing Sheets

METHOD FOR ASSEMBLING A BALUSTRADE FOR A PEOPLE MOVING DEVICE USING AN ADJUSTABLE ASSEMBLY JIG

BACKGROUND OF THE INVENTION a. Technical Field

The present invention relates to balustrades for people moving devices in general, and to methods for assembling balustrades for people moving devices in particular.

b. Background Art

Escalators, moving walkways, and other people moving devices efficiently move a large volume of pedestrian traffic from one point to another. Passengers step on moving steps (or belts, or pallets) and are transported along at a constant rate of speed. For safety reasons passenger handrails are provided, traveling in the same direction and speed as the steps. A balustrade assembly supports and guides one of the handrails on each side of the steps.

Each balustrade assembly includes balustrade panels (typically glass) which extend up from a base to support the handrail. The balustrade panels are supported and positioned by panel holders enclosed within the base by enclosure panels. Typically, the panel holders are attached to the frame of the device by adjustable brackets.

Proper alignment of the balustrade components is critical during assembly. Aesthetically, it is important that each balustrade be aligned with the device's other balustrade. In applications where escalators are installed side by side, it is also important that the balustrades of one escalator be aligned with the balustrades of the adjacent escalator. For safety reasons, alignment is critical to prevent injuries to passengers passing by misaligned joints.

It is known in the art that balustrades may be assembled piece by piece on the frame trusses of the escalator. Specifically, the assembly begins by locating and attaching the panel holders relative to the frame trusses. The remaining components are then located and attached to the panel holders and to each other as the balustrade assemblies are erected. There are several disadvantages to this piecemeal method of assembly.

First, mounting the balustrade components on the truss one at a time accumulates the dimensional tolerances of the components, since each piece is positioned relative to the last piece. Accumulated tolerances may not be a problem for a particular balustrade, but they are often a problem when one balustrade must be aligned with the other balustrade of that particular escalator. Moreover, alignment problems are often exacerbated when the balustrades of adjacent escalators must be aligned relative to one another.

Second, accumulated dimensional tolerances often require that one or more balustrade components be dimensionally altered before the component(s) can be installed. A person of skill in the art will recognize that the practice of custom fabricating or altering parts during assembly is a costly process. Moreover, if these parts require replacement in the future, the replacement part must also be customized.

Third, assembling each balustrade on top of the frame is cumbersome. Often scrap and debris generated during the assembly process must be cleaned out of the hardware already attached to the frame.

Fourth, it is impractical to assemble the balustrade piecemeal on the frame at the same time the rest of the escalator is being assembled. As a result, the time required to assemble the entire escalator is greater and therefore increases the leadtime of producing an escalator. A person of ordinary skill in the art will recognize that it is a competitive advantage to minimize the time required to manufacture an escalator.

DISCLOSURE OF THE INVENTION

It is, therefore, an object of the present invention to provide a method for assembling a balustrade of a people moving device which facilitates the assembly of the balustrade.

It is a further object of the present invention to provide a method for assembling dimensionally consistent balustrades for people moving devices.

It is a still further object of the present invention to provide a method for assembling a balustrade of a people moving device which minimizes the effects of dimensional inaccuracies of the balustrade components.

It is a still further object of the present invention to provide a method for assembling a balustrade of a people moving device which minimizes the effects of dimensional inaccuracies of the balustrade frame.

It is a still further object of the present invention to provide a method for assembling a balustrade for a people moving device which minimizes the time required for manufacturing the entire people moving device.

It is a still further object of the present invention to provide an assembly jig upon which a balustrade can be accurately assembled.

It is a still further object of the present invention to provide an transportation jig upon which an assembled balustrade can be transported.

According to the present invention a method for assembling a balustrade for a people moving device is provided comprising the steps of providing a frame, balustrade components, and an adjustable assembly jig, aligning the balustrade components on the assembly jig in a predetermined geometry, assembling the balustrade components into a balustrade assembly on the assembly jig, and attaching the balustrade assembly to the frame.

According to one aspect of the present invention, an alignment jig is provided for aligning the assembled balustrade relative to the roller tracks attached to the frame of the people moving device.

According to another aspect of the present invention, a transportation jig is provided for transporting the assembled balustrade.

An advantage of the present invention is that the problem of dimensional tolerance build up within the balustrade component parts is minimized or eliminated.

A further advantage of the present invention is that the problem of dimensional inaccuracies within the frame is minimized or eliminated.

A still further advantage of the present invention is that balustrade assemblies can be assembled to uniform dimensions. Uniformly dimensioned balustrade assemblies facilitate alignment of balustrades within a particular machine, as well as between adjacent machines. Uniformly dimensioned balustrades also facilitate component repair or replacement after installation.

A still further advantage of the present invention is that debris resulting from the assembly of the balustrade does not damage or interfere with the rest of the people moving device.

A still further advantage of the present invention is that the balustrade may be assembled coincidentally with the rest of the people moving device, thereby minimizing the time required to manufacture the people moving device.

These and other objects, features and advantages of the present invention will become more apparent in light of the detailed description of the best mode embodiment, thereof, as illustrated in the accompanying drawings.

DETAILED DESCRIPTION OF THE DRAWINGS

BEST MODE FOR CARRYING OUT THE INVENTION

I. Elements

Figure 1:
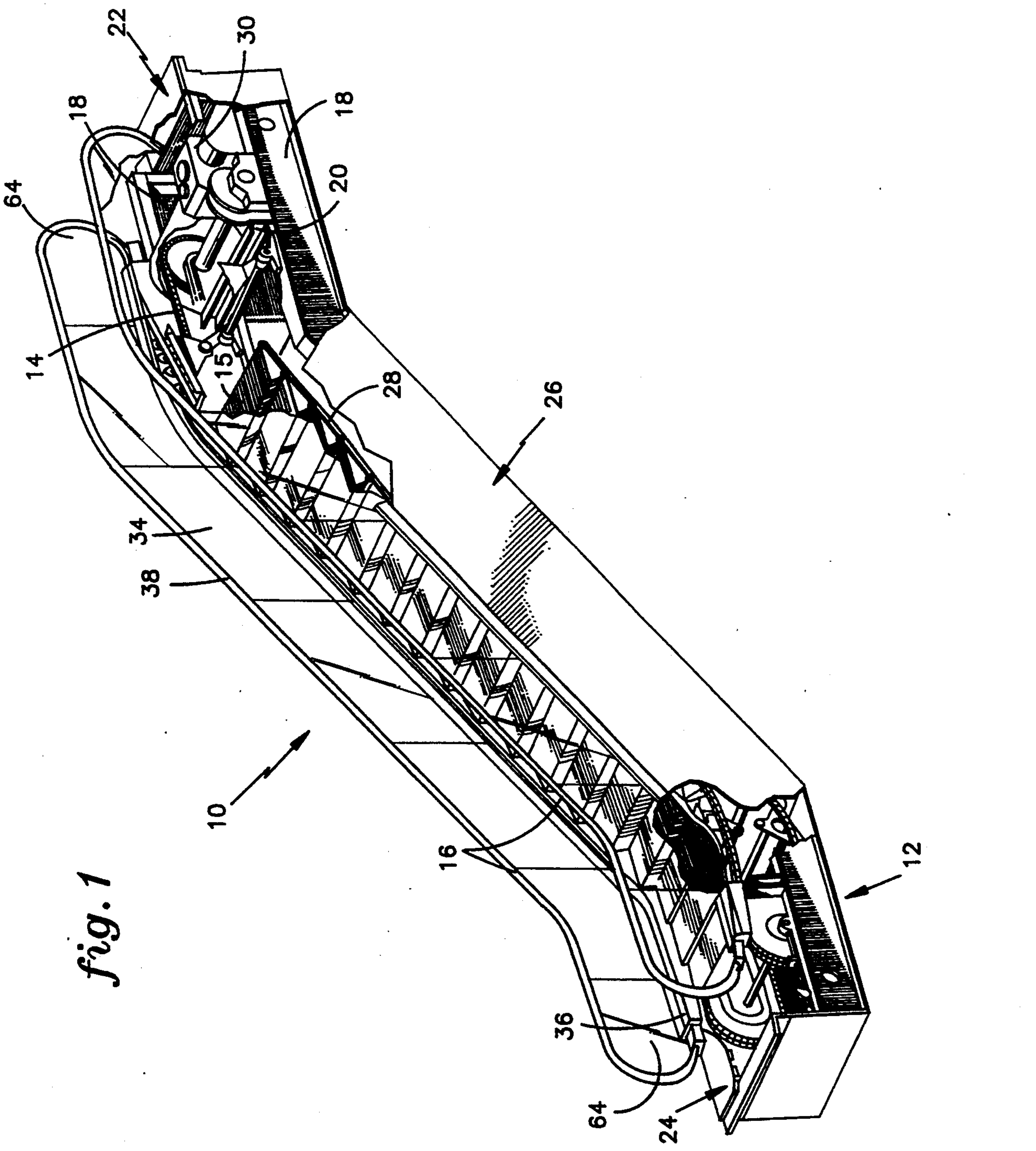
FIG. 1 is a diagrammatic view of an escalator having a pair of balustrade assemblies.

Referring to FIG. 1, an escalator 10 is shown having a frame 12, a step chain 14, a plurality of moving steps 15, and a pair of balustrade assemblies 16. The frame 12 includes two trusses 18 aligned side by side, connected to each other by structural members 20 running therebetween. The frame 12 may be described as having an upper landing 22 and a lower landing 24 connected to one another by an inclined midsection 26. Matching pairs of roller tracks 28 are attached on the inside of each truss 18, i.e. the side of the truss 18 facing the other truss. The upper landing 22 usually houses an escalator drive 30 between the trusses 18. The step chain 14 travels a closed loop, running from one elevation to the other elevation, and back.

Figure 2:
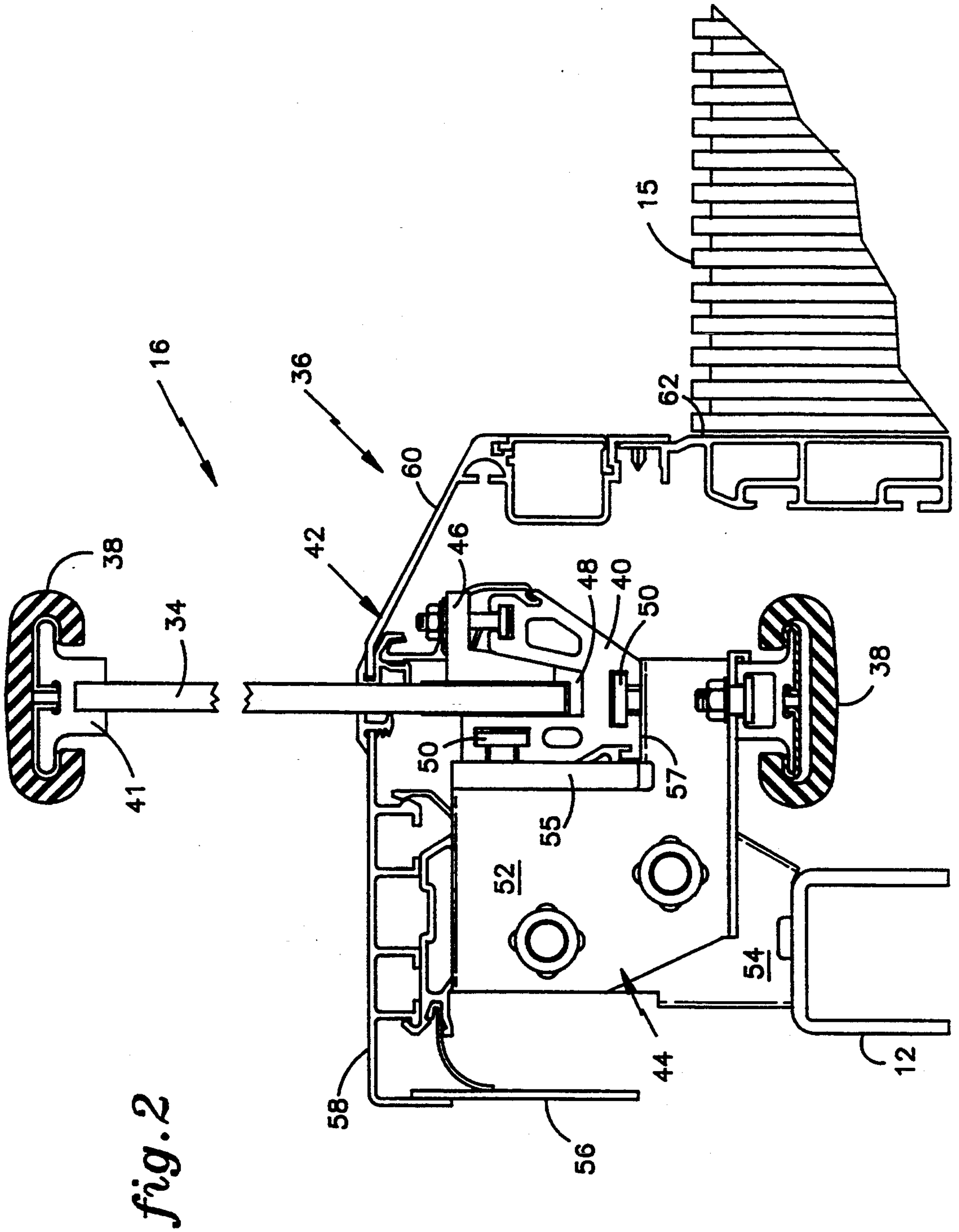
FIG. 2 is a sectional view of a balustrade assembly.

Referring to FIG. 2, each balustrade assembly 16 includes a plurality of balustrade panels 34, a base 36, a handrail 38, and handrail guides 41. The base 36 includes a panel holder(s) 40 for supporting the balustrade panels 34, a plurality of enclosure panels 42, adjustable panel holder brackets 44, and wedge-shaped clamps 46 for attaching the balustrade panels 34 to the panel holders 40. The panel holder 40 is an extruded, or otherwise formed member having a cross-sectional profile and a length. The cross-sectional profile includes a channel 48 and a pair of C-shaped slots 50, all of which extend the length of the panel holder 40. Each adjustable panel holder bracket 44 includes a first half 52 and a second half 54, which together may be adjusted in two axis of direction. The first half 52 of each bracket 44 includes a vertical 55 and a horizontal 57 locating surface for contact with the panel holder 40.

The enclosure panels 42 include an outer cladding 56, an outer decking 58, an inner profile 60, and a skirt panel 62. The outer decking 58 and outer cladding 56 enclose the mechanics on the side of the balustrade panel 34 opposite the moving steps 15. The inner profile 60 and skirt panel 62 enclose the mechanics adjacent the moving steps 15.

Referring to FIGS. 1 and 2, the handrails 38 form endless loops which travel from one end of the device to the other along the top of the balustrade panels 34 and then return through the base 36 of the balustrade assembly 16. At each end of the balustrade assemblies 16, the balustrade panels 34 have curved sections 64, or "newels", which enable the handrails 38 to curve down and into the base 36 of the balustrade 16.

Figure 3A:
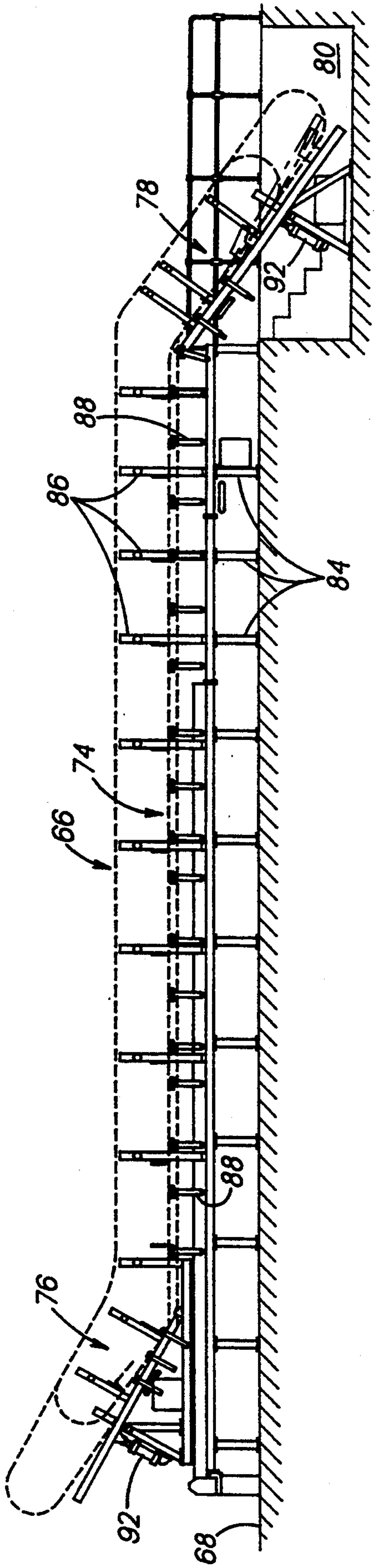
FIG. 3A is a diagrammatic side view of an assembly jig for assembling balustrades like that shown in FIG. 2.
Figure 3B:
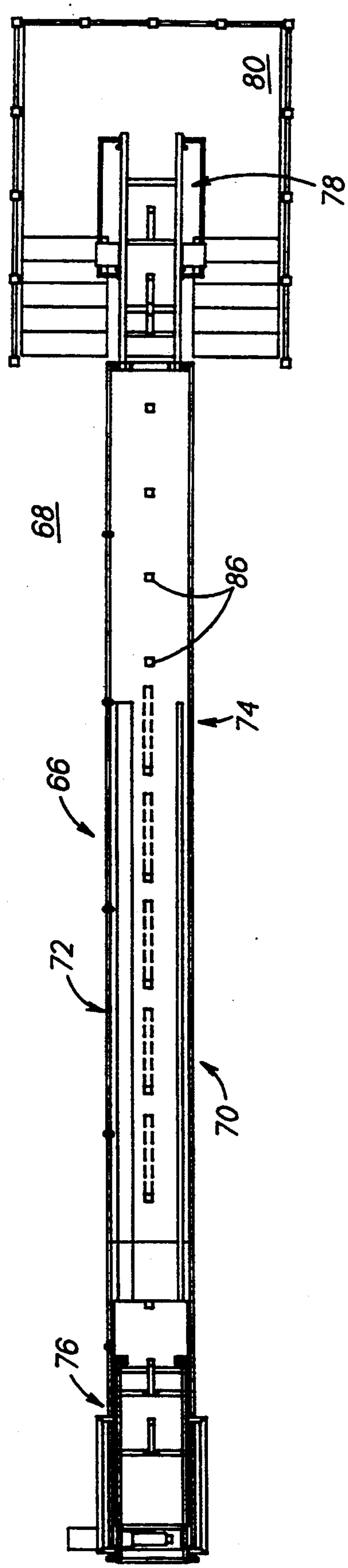
FIG. 3B is a top view of the assembly jig shown in FIG. 3A.

Referring to FIGS. 3A and 3B, an assembly jig 66, mounted on the floor 68 of the factory, includes a left hand 70 and a right hand 72 side (FIG. 3B), each having a midsection 74, a lower landing section 76, and an upper landing section 78. The upper landing sections 78 extend into a pit 80 in the floor 68, thereby enabling the midsections 74 to be positioned level to the floor 68. Left side balustrades (i.e. those on the left when facing the escalator at the bottom landing) are assembled on the right hand side of the assembly jig 66. Right side balustrades are assembled on the left hand side 70 of the assembly jig. Assembling the balustrades 16 in this "back to back" manner facilitates the relative alignment of the enclosure panels 42 of each balustrade 16.

The midsections 74 of the assembly jig 66 may be adjusted lengthwise to accommodate different length balustrade assemblies 16. Specifically, the lower landing sections 76 may be driven along the midsections 74 by electromechanical drives (not shown), toward the upper landing sections 78 to specific positions for particular length (or "rise") escalators. A series of columns 84 (FIG. 3A), fixed to the floor 68, support the assembly jig 66.

The assembly jig further includes a plurality of stanchions 86 and panel holder mounts 88. The panel holder mounts 88 are fixed to, and spaced along, the midsections 74 and both landing sections 76,78.

Figure 6A:
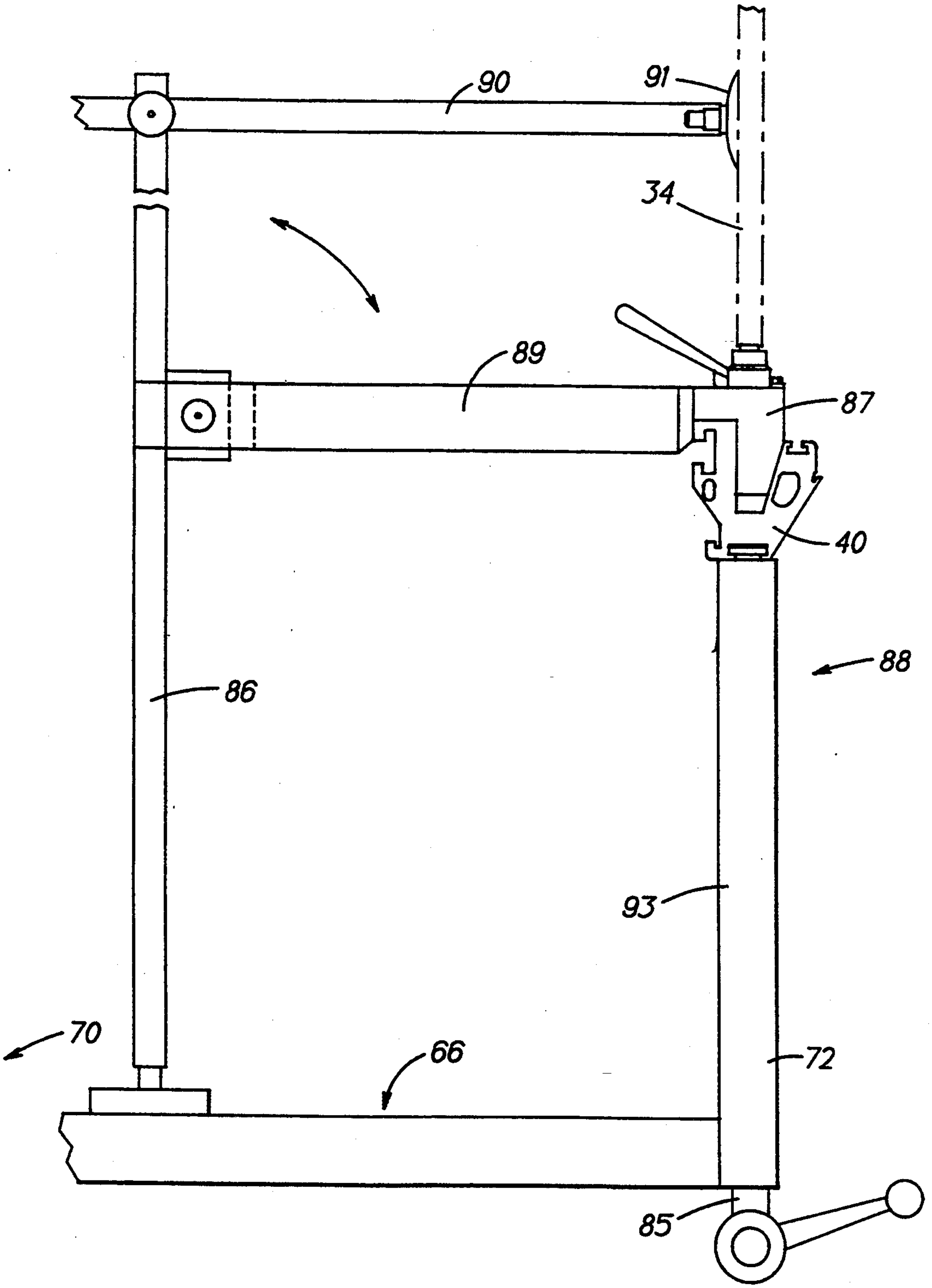
FIG. 6A is a diagrammatic view of the panel holder mounts and stanchions mounted on the assembly jig.

Referring to FIG. 6A, each panel holder mount 88 includes a locating member 89 and an adjustable support member 93. The locating member 89 is pivotly attached to a stanchion 86. Each locating member 89 comprises a clamping wedge 87 for clamping the panel holder 40 to the locating member 89. Each support member 93 includes a clamping means 85 for fixing the panel holder to the support member 93.

The stanchions 86 are attached to the assembly jig 66 between the two sides 70,72 (see also FIGS.3A and 3B) and include arms 90 having suction cups 91 for supporting the balustrade panels 34 during assembly. The stanchions 86 may be pivoted down and out of the way to avoid interference with the lower landing sections 76 (see FIGS. 3A and 3B) for different length balustrades. FIGS. 3A and 3B show stanchions 86 pivoted out of the way in phantom.

Referring to FIGS. 3A and 3B, the upper 78 and lower 76 landing sections of the assembly jig 66 may be adjusted for length by either adding rail extensions (not shown) on, or by replacing the existing landing rail assemblies 76,78 with longer ones. The upper and lower landing sections 78,76 are supported by fluid cylinders 92 mounted on the left and right hand sides 70,72 of the midsection 74. The fluid cylinders 92 can be used to pivot, and thereby change the angle of, the landings 76,78 relative to the midsection 74 for different escalator inclinations. Alternatively, the angle of the landings 76,78 relative to the midsection 74 can be changed by different toolings, adjustable brackets, etc.

Figure 4:
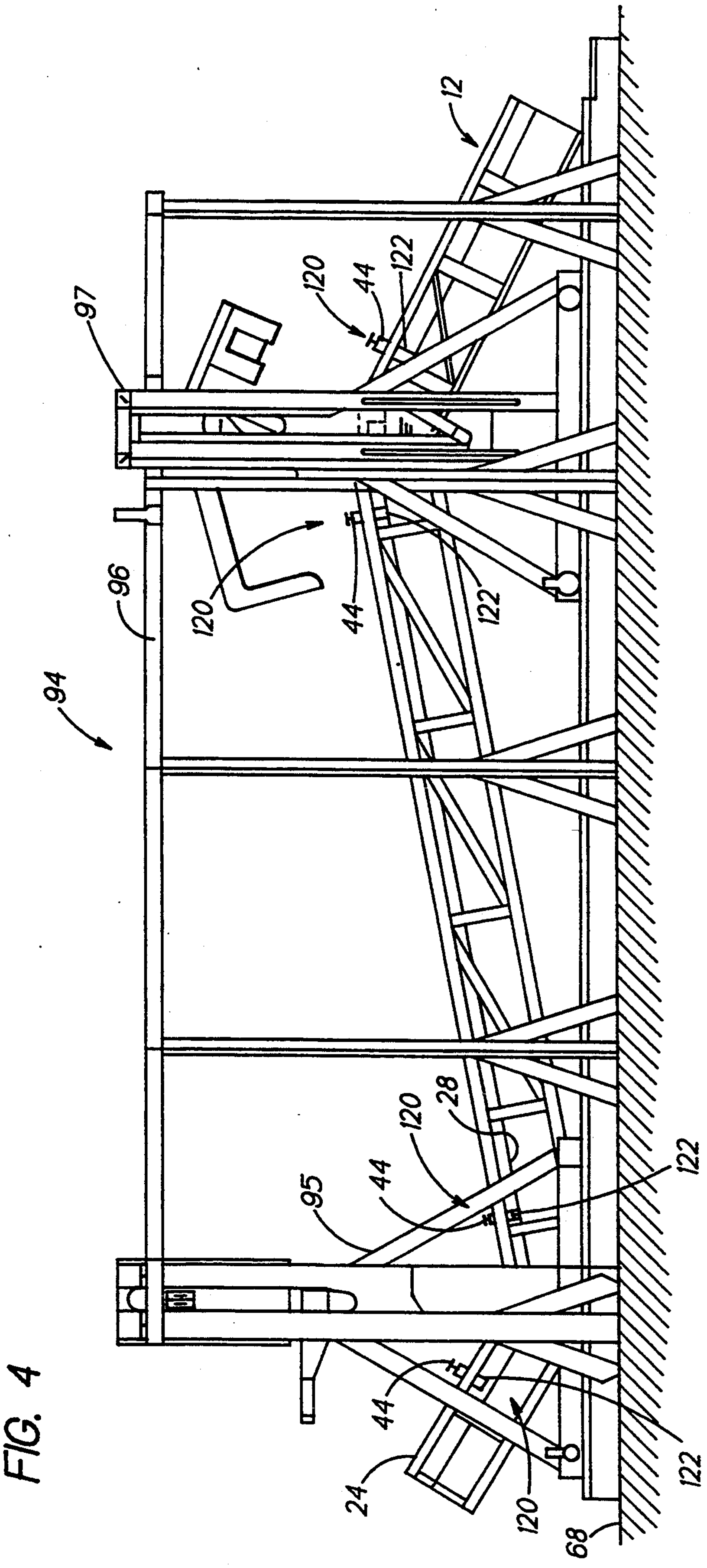
FIG. 4 is a diagrammatic view of an alignment jig for aligning assembled balustrades relative to the frame of an escalator.

Referring to FIG. 4, the alignment jig 94 comprises a rigid structural frame 96 fixed to the floor 68 of the factory. On one end, the jig 94 includes a fixed post structure 95 for locating the roller tracks 28 in the lower landing 24 area of the frame 12. On the other end, the alignment jig 94 includes a movable post structure 97 which may be moved to accommodate different geometry escalators.

The alignment jig 94 locates the roller tracks 28 on the frame 12, correct relative to one another. The alignment jig 94 further comprises means 120 for locating the panel holders 40 of the balustrade assembly 16 (FIG. 2) relative to the roller tracks 28. In the preferred embodiment, the locating means 120 comprises a plurality of physical gauges 122 which locate panel holder brackets 44 relative to the roller tracks 28 at specific positions along the length of the roller tracks 28. The gauges 122 locate the panel holder brackets 44 both horizontally and vertically. Different gauges 122 may be used for differently configured balustrade assemblies. A person of ordinary skill in the art will recognize that the gauges 122 may comprise numerous embodiments; i.e. as simple as a machined spacer (shown), or as complex as an adjustable automated component which is sized and positioned automatically by robotics (not shown).

Figure 5B:
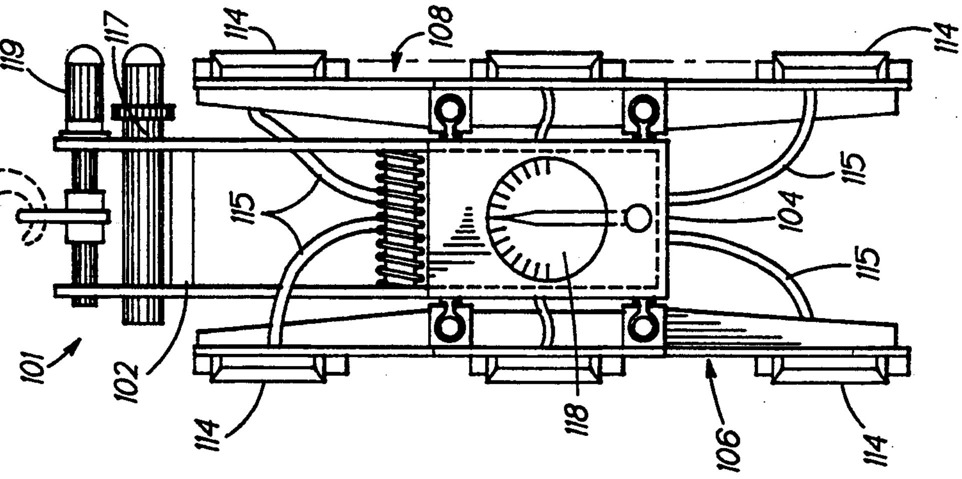
FIG. 5B is a end view of the transportation jig shown in FIG. 5A.
Figure 5A:
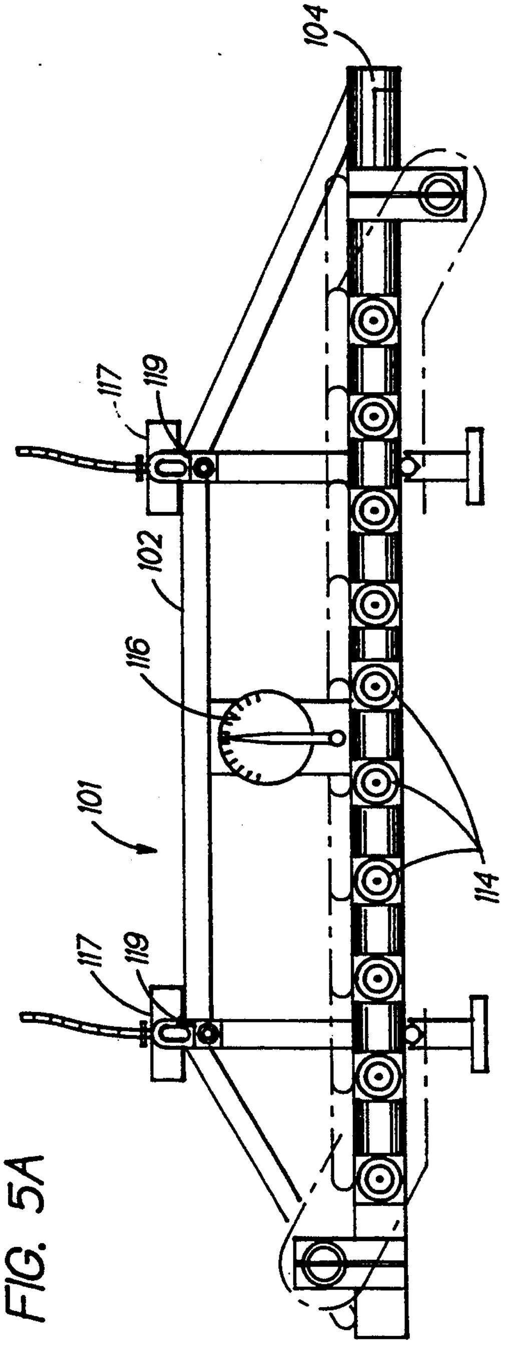
FIG. 5A is a diagrammatic side view of a transportation jig for transporting assembled balustrades.

Referring to FIGS. 5A and 5B, the transportation jig 101 comprises a frame 102, left 106 and right 108 support arms, horizontal 116 and vertical indicators 118, and horizontal 117 and vertical 119 drive assemblies. The frame 102 includes a pressure vessel 104 fabricated from a length of tubular steel with a cap welded on both ends. The left 106 and right 108 support arms, attached to the left and right sides of the pressure vessel 104, each support a plurality of suction cups 114. The suction cups 114 are attached to the pressure vessel 104 by conventional plumbing 115. The horizontal 116 and vertical 118 indicators indicate angular deviation of the jig 101 from horizontal and vertical reference planes. The horizontal 117 and vertical 119 drive assemblies include conventional apparatus for imparting horizontal and vertical motion to the transportation jig 101, respectively. To be specific, the drive assemblies 117,119 are used to move the lifting point of the transportation jig 101 (i.e. the force vector provided by the overhead crane), thereby enabling the lifting point to be adjusted relative to the center of gravity of the jig 101. A person of ordinary skill in the art will recognize that the aforementioned conventional apparatus may be electromechanical, hydraulic, pneumatic, or otherwise.

II. Assembly

An escalator is assembled along an assembly line (not shown). At a particular station, the alignment jig 94 (see FIG. 4) is used to position and attach the roller tracks to the frame, as well as a pair of panel holder brackets in each landing of each side. At the same time, at a separate station, the balustrades of the escalator are being assembled on the assembly jig (see FIGS. 3A, 3B, and 6).

Referring to FIG. 6A, in the assembly of each balustrade, lengths of extruded panel holder 40, either straight or shaped, are attached to the panel holder mounts 88 of the assembly jig 66. Specifically, the locating members 89 are positioned in the horizontal position (as shown in FIG. 6A) and the panel holders 40 are attached. The clamping wedge 87 located at the end of each locating member 89 both attaches and locates the panel holder lengths 40.

Once the panel holders 40 are in the correct position, the support members 93 are clamped to the panel holders 40 by the clamping means 85. Subsequently, the locating members 89 are released and pivoted out of the way as is shown in phantom in FIG. 6B. The panel holders 40 are now supported by the support members 93.

Figure 6B:
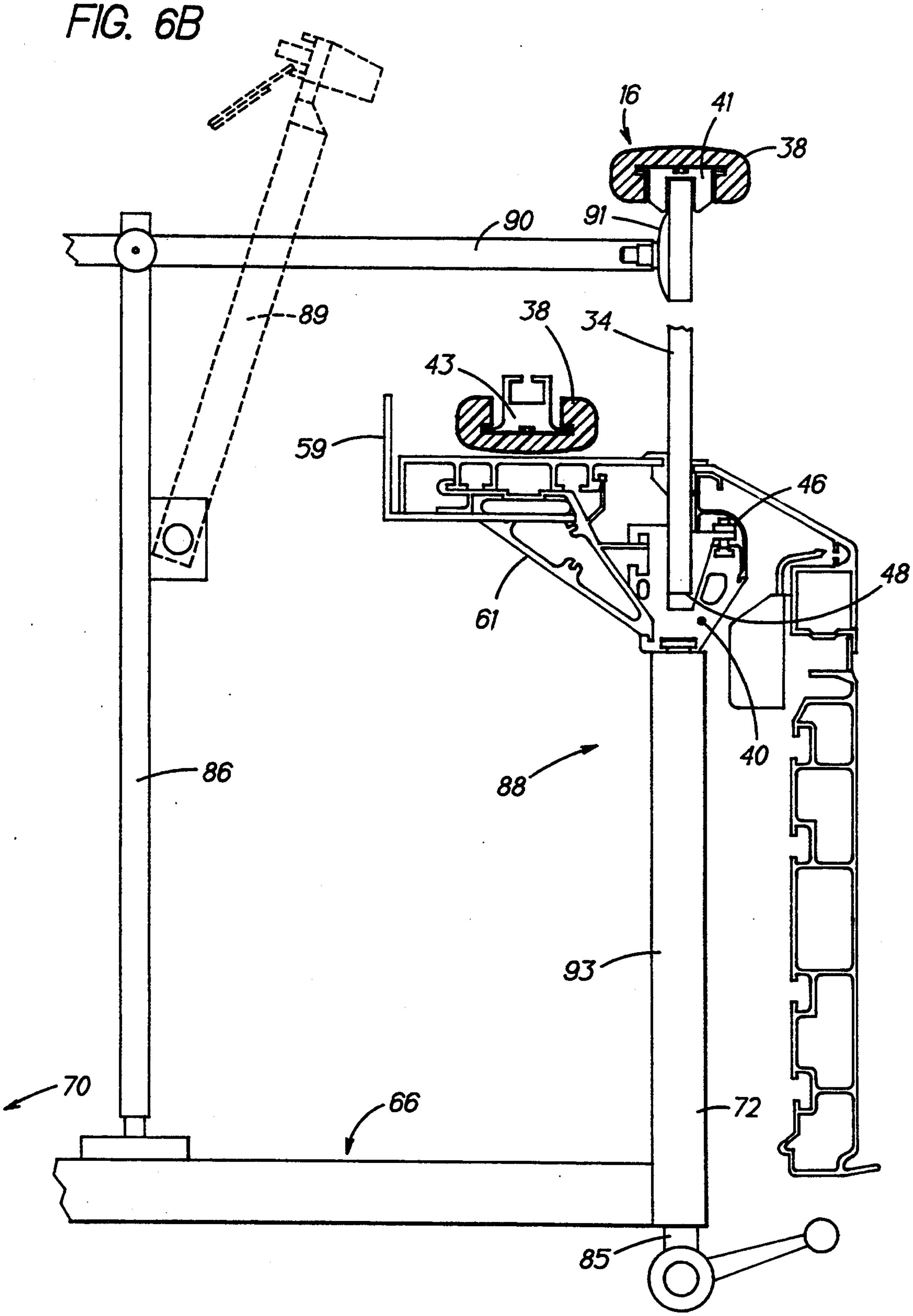
FIG. 6B is a diagrammatic view of the balustrade assembly mounted on the assembly jig.

Referring to FIG. 6B, once the panel holders 40 are secured to the assembly jig 66, the balustrade panels 34 are placed within the channels 48 of the panel holders 40. The arms 90 and suction cups 91 attached to the stanchions 86 are used to support the balustrade panels 34 while the panels 34 are being secured within the panel holders 40. The balustrade panels 34 are fixed in place by the wedge clamps 46 of the base 36.

Once the panel holders 40, balustrade panels 34, and wedge clamps 46 have been assembled as described heretofore, the handrail guides 41 and handrails 38 are attached to the assembly. Next, the enclosure panels 42 are attached to the panel holders 40. The assembled balustrade 16 is now a rigid assembly and maybe transported as a single assembly.

To facilitate mounting the assembled balustrade 16 on the frame 10 of the escalator 10 (see FIG. 1), the return handrail guide 43 is temporarily placed on top of the outer decking 58. A temporary bracket 59 attached to the support hardware of the balustrade 16 keeps the return handrail guide 43 on top of the outer decking 58. After the balustrade 16 is attached to the frame 12 (see FIG. 1), the bracket 59 is removed and the return handrail guide 43 is properly positioned.

In the case where both balustrades 16 of an escalator 10 (FIG. 1) are being assembled on the assembly jig 66 at the same time, the left and right balustrade assemblies are assembled on the right 72 and left 70 sides of the assembly jig 66, respectively. Assembling the balustrades 16 in this "back-to-back" manner allows the assemblers to adjust for any dimensional discrepancies between the two balustrades 16.

At this point in the assembly of the escalator, the roller tracks 28 and a few panel holder brackets 44 have been positioned and fixed to the frame 12, the latter by using the gauges 122 of the alignment jig 94.

Referring to FIGS. 5A and 5B, overhead cranes (not shown) bring the transportation jig 101 into position adjacent the assembly jig 66 (shown in phantom in FIG. 6B). In this position, the transportation jig 101 is on the inside of either balustrade assembly 16; i.e. the side of the balustrade that will be adjacent the moving steps 15 of the escalator 10. The suction cups 114 on the side of the transportation jig 101 adjacent the balustrade assembly 16 are subsequently brought into contact with the balustrade panels 34. The suction cups 114 are then attached to the balustrade panels 34 by evacuating the air within the suction cups 114. The balustrade assembly 16 is subsequently released from the assembly jig 66 and may be moved to the frame for attachment.

Referring to FIG. 5B, the suction cups 114 on the opposite side of the transportation jig 101 permit the jig 101 to be attached to the inside surface of either hand balustrades by lifting the jig 101 over the assembly jig 66, rather than having to rotate the transportation jig 101.

A person of ordinary skill in the art will recognize that the process of moving the assembled balustrades 16 may be automated in varying degrees. For example, the process could involve manual positioning of the transportation jig 101 relative to the assembled balustrade 16, and subsequently attaching the jig 101 to the assembly. On the other hand, given certain characteristics of the balustrade assembly 16 to be moved, the position of the transportation jig 101 relative to the balustrade 16 necessary to compensate for the center of gravity of the balustrade 16 could be calculated. Fine tuning of the vertical and horizontal balustrade position could then be automatically adjusted via the vertical 119 and horizontal drives 117, given feedback from the vertical 118 and horizontal 116 gauges. In either case, the final position of the balustrade 16 being transported would be proper relative to the panel holder brackets 44 attached to the frame 12 traveling down the assembly line from the alignment jig 94.

The assembled balustrade 16 is attached to the panel holder brackets 44 which are already fixed to the frame of the escalator 10. Since these brackets 44 have been positioned relative to the roller tracks 28 in the alignment jig 94, there is no need to adjust the position of the assembled balustrade 16. More panel holder brackets 44 are attached along the frame 12 as necessary.

Although the invention has been shown and described with respect to a best mode embodiment thereof, it should be understood by those of ordinary skill in the art that the foregoing and various other changes, omissions and additions in the form and detail thereof may be make herein without departing from the spirit and scope hereof.

We claim:

1. A method for assembling a balustrade for a people moving device, comprising the steps of:
   providing a structural frame truss for a people moving device;
   providing balustrade components for a people moving device;
   providing an adjustable assembly jig;
   aligning said balustrade components on said assembly jig in a predetermined geometry, wherein said adjustable assembly jig may be adjusted for different balustrade geometries;
   assembling said balustrade components into a balustrade assembly on said assembly jig; and
   attaching said balustrade assembly to said frame truss;
   wherein said balustrade assembly may be positionally adjusted and attached to said truss as an assembly.

2. A method for assembling a balustrade according to claim 1, wherein said step of providing balustrade components comprises providing a plurality of balustrade panels, balustrade panel holders, brackets for mounting said panel holders to said truss, handrail guides, and handrails.

3. A method for assembling a balustrade according to claim 2, wherein said step of assembling said balustrade components comprises the steps of:
   attaching said balustrade panel holders to said assembly jig in a predetermined position established by said assembly jig;
   attaching said balustrade panels to said panel holders; and
   attaching said handrail guides to said balustrade panels around the periphery of said balustrade panels;
   wherein said assembly jig locates said panel holders in a specific position and the other balustrade components are located with respect to said panel holders in a specific position.

4. A method for assembling an escalator balustrade according to claim 1, wherein said adjustable assembly jig comprises:
   a left and right hand side, each having a midsection, a lower landing section, and a second landing section;
   wherein said landing sections are pivotally attached to said midsections; and
   wherein the length of each midsection may be altered for different rise escalators, and the length of each landing section may be altered for different length landings, and the angle of said landing sections relative to their respective midsections may be altered for different pitch escalators.

5. A method for assembling an escalator balustrade, comprising the steps of:
   providing an escalator structural frame, having roller tracks;
   providing escalator balustrade components, including panel holders, and panel holder brackets;
   providing an adjustable assembly jig, said assembly jig including a means for positioning said panel holders in a desired balustrade geometry;
   assembling said balustrade components into a balustrade assembly on said assembly jig; and
   attaching said balustrade assembly to said structural frame.

6. A method for assembling an escalator balustrade according to claim 5, further comprising the steps of:
   providing a means for locating said panel holders of said balustrade assembly relative to said roller tracks;
   positioning a plurality of said panel holder brackets relative to said roller tracks using said locating means, such that said panel holders may be maintained in a predetermined position by said panel holder brackets; and
   fixing said panel holder brackets to said frame;
   wherein said positioned and fixed brackets enable said balustrade assembly to be attached to said frame without adjustment.

7. A method for assembling an escalator balustrade according to claim 6, wherein said means for locating the panel holders of the balustrade assembly relative to the roller tracks comprises:
   a gauge block, said gauge block physically locating said panel holder brackets relative to said roller tracks.

8. A method for assembling an escalator balustrade according to claim 6, wherein said means for positioning said panel holders in a desired balustrade geometry comprises:
   a plurality of mounts for mounting said panel holders to said assembly jig, said mounts vertically and horizontally positioning said panel holders in a predetermined geometry.

9. A method for assembling an escalator balustrade according to claim 5, wherein said means for positioning said panel holders in a desired balustrade geometry comprises:
   a plurality of mounts for mounting said panel holders to said assembly jig, said mounts vertically and horizontally positioning said panel holders in a predetermined geometry.

* * * * *